Figure 1:
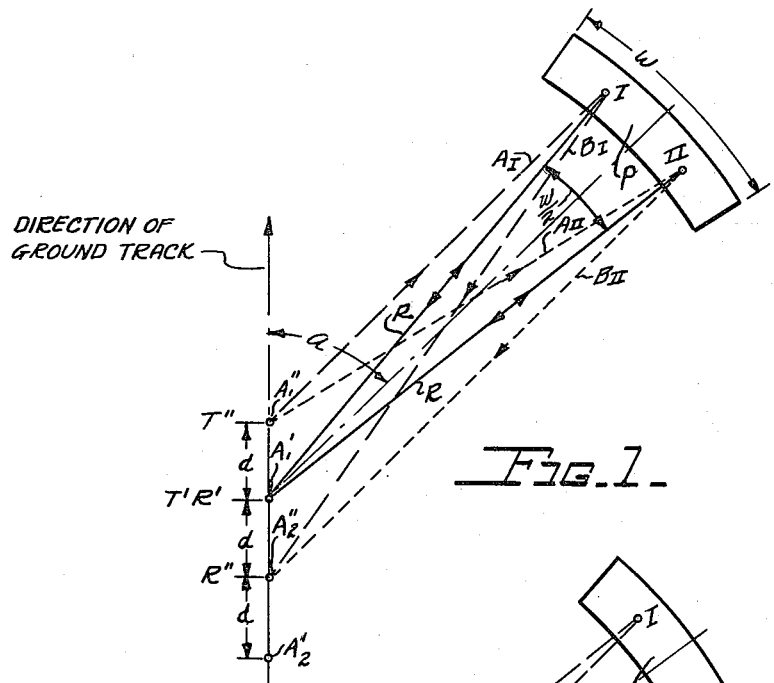

Dec. 24, 1963    H. P. RAABE    3,115,626
AIRBORNE MOVING TARGET INDICATION SYSTEM
Filed Sept. 22, 1953    2 Sheets-Sheet 1

INVENTOR.
HERBERT P. RAABE.
BY James S. Shannon
Wade Kountz
AGENT
ATTORNEY

Dec. 24, 1963     H. P. RAABE     3,115,626
AIRBORNE MOVING TARGET INDICATION SYSTEM
Filed Sept. 22, 1953     2 Sheets-Sheet 2
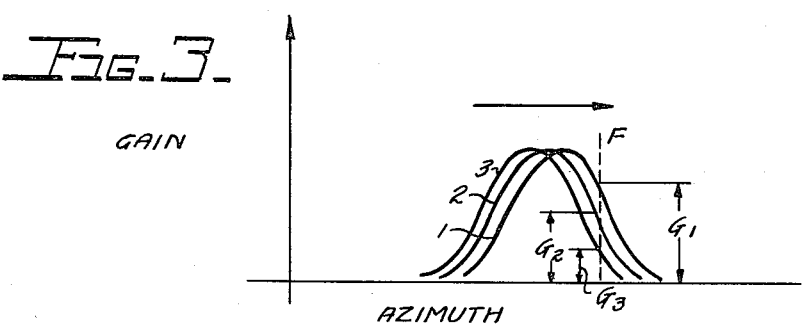
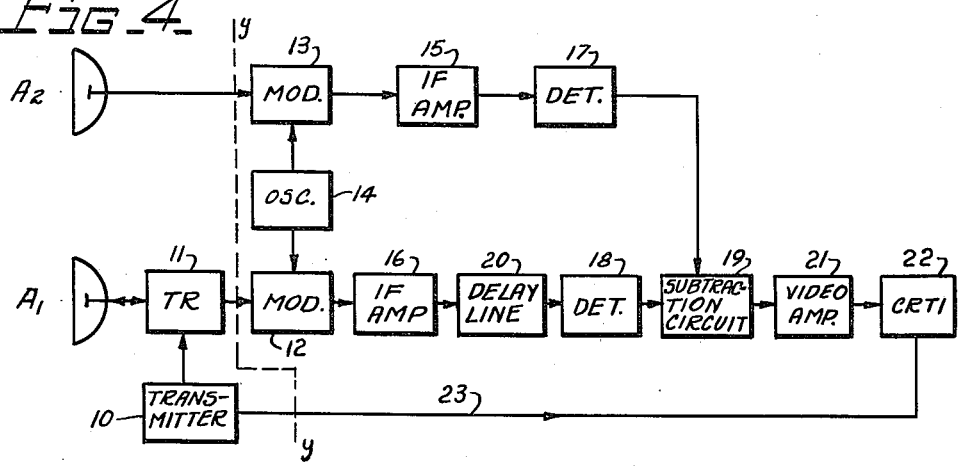
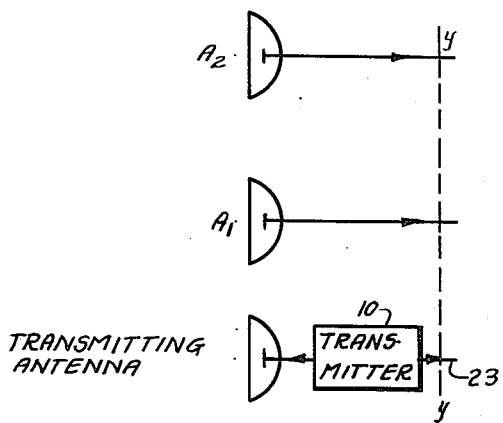
INVENTOR.
HERBERT P. RAABE.
BY
AGENT.
ATTORNEY United States Patent Office 3,115,626
Patented Dec. 24, 1963

3,115,626
AIRBORNE MOVING TARGET INDICATION SYSTEM
Herbert P. Raabe, Dayton, Ohio, assignor to the United States of America as represented by the Secretary of the Air Force
Filed Sept. 22, 1953, Ser. No. 381,767
8 Claims. (Cl. 343—7.7)
(Granted under Title 35, U.S. Code (1952), sec. 266)

The invention described herein may be manufactured and used by or for the Government for governmental purposes without payment to me of any royalty thereon.

Conventional radar airborne moving target indicating systems (AMTI) use a single antenna for transmission and reception and a storage device or delay line so that two successive returns can be subtracted in order to cancel the return from the ground. Due to the motion of the airplane cancellation is imperfect. An improved scheme has been suggested in which two antennas are used. Both antennas have the same characteristics and are mounted a distance apart, parallel to the ground track, equal to the distance travelled by the airplane between successive transmissions, with the result that the second antenna reaches the location of the first antenna when the pulse repetition or delay time has passed. After the first antenna has transmitted and received the first pulse the second antenna transmits and receives the second pulse at the same place in space, so that improved cancellation can be expected when the second video pulse is subtracted from the delayed first pulse.

The latter system requires switching of radio frequency circuits for each transmission, and its accuracy of performance depends upon the pattern match of the two antennas. These two requirements are rather severe. It is the object of this invention to provide an AMTI system in which the requirement for switching of radio frequency circuits is eliminated and in which the pattern match requirement is reduced.

Basically, the system comprises two receiving antennas, spaced in the direction of the ground track by a distance equal to twice the distance travelled by the airplane between pulse transmissions, and a transmitting antenna. While the transmitting antenna is travelling forward the receiving point travels an equal distance backward if two successive pulses received by the first and second antennas are considered. Therefore, substantially complete cancellation of these pulses can be obtained in a delay-subtraction circuit as if the radar were stationary. The transmitting antenna may be a separate antenna or one of the antennas may be both a transmitting and a receiving antenna. Since transmission occurs from only one antenna no switching of radio frequency circuits is required. Also the pattern matching problem is eased since, with only one transmitting antenna, the requirement for matching the transmitting patterns is eliminated, which reduces the possible error in the received pulse from this source by one-half. If a separate transmitting antenna is used further improvement in this direction can be achieved by widening the beamwidths of the two receiving antennas and narrowing the beamwidth of the transmitting antenna so that the angular resolution remains unchanged. With this arrangement only a narrow sector around the maximum of the receiving pattern is used, which is much easier to hold to small tolerances. Such an arrangement requires more power but this and the use of the additional antenna are at least partly compensated by the fact that the receiving antennas are much smaller and the requirement for a duplexer in the radio frequency circuit is removed. The system also offers the possibility of reducing scanning fluctuation due to the antenna pattern by suitable angular separation of the antenna patterns.

Figure 2:
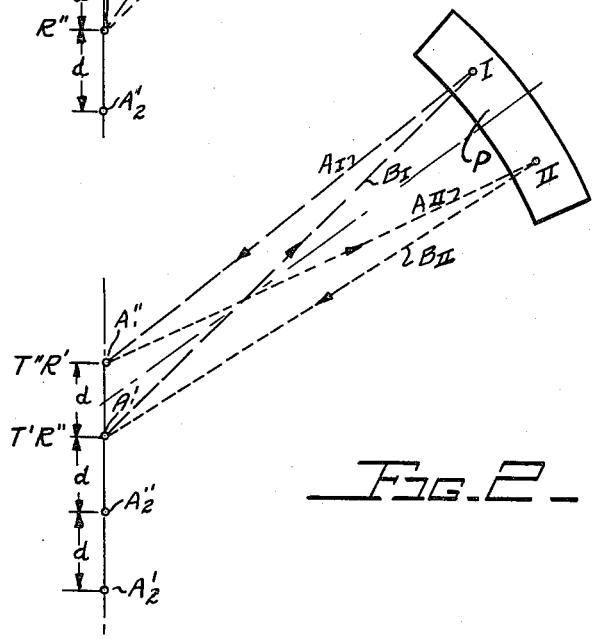

The invention will be described in more detail in connection with the accompanying drawings, in which FIGS. 1 and 2 are diagrams illustrating the operating principles of the antenna system;

FIG. 3 is a diagram illustrating the adjustment of the antenna patterns for scanning fluctuation cancellation; and FIGS. 4 and 5 show suitable AMTI systems in block form incorporating the antenna system.

The principle of the invention is illustrated in FIG. 1. The two antennas $A_1$ and $A_2$ are spaced parallel to the ground track $2d$, $d$ being the distance travelled by the airplane between successive pulse transmissions. Antenna $A_1$ only is used for transmission but both antennas are used for reception. Considering two successive pulse transmissions, $A_1'$ and $A_2'$ represent the positions of the two antennas at $T'$, the time of the first pulse transmission, and $A_1''$ and $A_2''$ represent the positions of the antennas at $T''$, the time of the second pulse transmission. $R'$ and $R''$ represent the receiving points for the first and second pulse transmissions, respectively. In the AMTI system $A_1$ continuously feeds the storage device or delay line, while $A_2$ delivers the cancellation pulse.

A ground patch at a relatively close range is represented by the area P falling within the beamwidth $w$ and having a depth equal to the distance travelled by an electromagnetic wave in one-half the transmitted pulse duration. Such a ground patch represents the limit of resolution of the radar. It is permissible to assume the patch to consist of two fixed isolated isotopic reflectors I and II. With respect to the antenna position $A_1'$ these targets are at the same range R and their horizontal spacing is equal to $$\frac{w}{2}$$

When the first pulse is transmitted at time $T'$, the return from the two targets I and II arrives within a fraction of the pulse repetition time and since the range is assumed to be small the antenna displacement is relatively small. Therefore the reception of this pulse takes place at the same location as that at which the transmission occurred. The two-way transmission paths to both targets are alike and equal to 2R. When the second pulse is transmitted at time $T''$ the transmitting place has moved by the distance $d$ to $A_1''$. Therefore, the distances $A_I$ and $A_{II}$ to the two targets are shorter than R, and $A_I$ is slightly shorter than $A_{II}$. The reception of the return of the second pulse takes place at the position $A_2''$ which is separated by a distance $2d$ from the transmitting position $A_1''$. The distances $B_I$ and $B_{II}$ between this position and the two targets is greater than R by approximately the same amount that $A_I$ and $A_{II}$ were shorter. Since $B_I$ is slightly greater than $B_{II}$, $A_I + B_I$ is nearly equal to $A_{II} + B_{II}$. The difference $$e = A_{II} + B_{II} - A_I - B_I$$

is a measure of the completeness of cancellation, theoretically perfect cancellation being obtained when $e = 0$. The approximate value of $e$ is $$\frac{wd^2}{2R} \sin 2\alpha$$

and for practical radar parameters is of the order of one millionth of a wavelength. This error is so small that it would not be able to impair the practically obtainable cancellation.

In the above analysis it was assumed that the range was small and, therefore, the antenna displacement during the transmission time was negligibly small. However, it is evident from the above expression for $e$ that as the range increases $e$ becomes still smaller. Further, as the range approaches the maximum range of the system the receiving point $R'$ of the first pulse approaches a position which is at a distance $d$ ahead of the transmission point $A_1'$, and the reception of the second pulse occurs at the point R″ which is at a distance d behind the transmission point A₁″, as shown in FIG. 2. In this case the transmission paths for the two successive pulses are identical and e becomes zero. This improvement is not obtained when the second antenna is used for transmission.

As already mentioned in the above described system the problem of matching antenna patterns is not so severe as in the case of the system in which transmission takes place from two antennas, since the problem of transmitting pattern matching is nonexistent. Further, if a separate antenna is used for transmission, its beamwidth can be reduced to preserve resolution and the beamwidths of the two receiving antennas may be broadened, which makes the matching of their patterns simpler since only a narrow sector of the pattern on either side of the maximum is used. Such an antenna combination requires more transmitting power in order to maintain the same receiving level, however, the increase in power required is considerably less than the increase in beamwidth ratio. The disadvantage that three antennas are required, as already stated, is partly compensated by the fact that the receiving antennas are much smaller for the wider beamwidths and the radio frequency circuit is simplified by the absence of a duplexer.

It is possible in the above described system to cancel scanning fluctuation resulting from the antenna patterns. For example, if a target is coming into the beam of the first antenna, the illumination due to the first pulse will be smaller than that due to the succeeding pulse. Therefore, the second antenna will receive a slightly stronger return than the first antenna if the beams are parallel, which results in imperfect cancellation. However, if the beam of the second antenna is slightly turned so that it lags with respect to the first antenna beam, the gain is reduced and, with proper adjustment, the returns at both antennas may be made equal in amplitude so that the scanning fluctuation is eliminated. This effect, which is illustrated in FIG. 3, can be utilized only if the beamwidths of the two antennas are equal. The curves show the antenna characteristic in three positions. The scanning occurs in the direction of the arrow and a target may be in position F. Curve 2 is the characteristic of the first antenna for the first transmission and reception. Curve 1 is the same characteristic in the position for the second transmission. Curve 3 is the characteristic of the second antenna when the second pulse is received. This characteristic lags by twice the angle the antenna system scanned during the pulse repetition period or delay time, so that the square of the intermediate gain approximately equals the product of the greater and smaller gains.

FIGS. 4 and 5 show AMTI radar systems in block form incorporating the above described antenna system. In FIG. 4, A₁ serves for both transmission and reception while A₂ is a receiving antenna only. FIG. 5 illustrates the use of a separate transmitting antenna as described above.

Moving target indication radar systems of both the stationary and airborne types are described in the literature, for example, Chapter 16 of Radar System Engineering—Ridenour, Radiation Laboratory Series, Volume 1, McGraw-Hill. The system of FIG. 4 utilizes the non-coherent method of moving target detection described in Section 16–12 of this reference. This method is based upon the fact that, in the output of a non-limiting receiver, the resultant echo signal from a target moving in the ground clutter varies in amplitude from pulse to pulse, whereas the return from a stationary ground object has a constant amplitude from pulse to pulse. By subtracting successive echoes from a target those from a stationary reflector are cancelled since their amplitude does not vary from pulse to pulse, but those from a moving target leave a residue, due to the change in amplitude between pulses, which constitutes a moving target video signal.

In the system of FIG. 4, transmitter 10 generates pulses of high frequency energy at a constant pulse repetition rate and these are applied through transmit-receive network 11 to antenna A₁ for radiation toward the earth. The network 11 prevents these high energy pulses from reaching modulator 12 but allows reflected energy received by A₁ to reach the modulator. This antenna therefore serves both as a transmitting and a receiving antenna. Antenna A₂, operating only as a receiving antenna, applies its received energy to modulator 13. The pulses of high or radio frequency energy received by A₁ and A₂ are reduced to pulses of intermediate frequency energy by beating in modulators 12 and 13 with the frequency of a common local oscillator 14. The pulses of intermediate frequency energy are amplified in similar non-limiting intermediate frequency amplifiers 15 and 16, detected in detectors 17 and 18 and the resulting video pulses applied to subtraction circuit 19. Prior to detection, the intermediate frequency pulse output of amplifier 16 is delayed by one pulse repetition interval in delay line 20. Therefore the video echo signals representing successive returns from a target, received by A₁ and A₂ in the manner already explained, are simultaneously applied to subtraction circuit 19. If the returns are from a stationary reflector, the simultaneously applied pulses are of the same amplitude and no output from circuit 19 occurs. However, if the returns are from a moving target the simultaneously applied pulses are of unequal amplitudes, due to the above discussed amplitude variation that occurs from pulse to pulse in the case of moving targets, and a residue signal appears in the output of circuit 19 which, after amplification in video amplifier 21, is applied to cathode-ray tube indicator 22. The sweep of indicator 22 is synchronized with the transmitted pulses by means of a synchronizing circuit 23.

The system of FIG. 4 can be converted to use with a separate transmitting antenna by substituting the apparatus of FIG. 5 for the apparatus to the left of line y—y in FIG. 4. In this case A₁ operates as a receiving antenna only. In other respects the operation of the system is the same as described above.

Although the invention is illustrated in FIGS. 4 and 5 as used with an AMTI receiver of the non-coherent type, it is not limited to such use and may equally well be used with a receiver of the coherent type in which the reference signal supplied by the coherent oscillator is shifted in phase to compensate for the velocity of the airplane, as described in Section 16–11 of the above cited reference.

I claim:

1. In an airborne radar moving target indicating system, means for directionally transmitting periodic pulses of radiant energy from a single point on the aircraft and for receiving reflected energy at two points on the aircraft, said two receiving points being spaced parallel to the ground track of said aircraft by a distance equal to twice the distance travelled by the aircraft during the interval between transmitted pulses.

2. An airborne radar moving target indicating system comprising means for directionally transmitting periodic pulses of radiant energy from a single point on the aircraft and for receiving reflected energy at two points on the aircraft, said two receiving points being spaced parallel to the ground track of said aircraft by a distance equal to twice the distance travelled by the aircraft during the interval between transmitted pulses, means for delaying the energy received at one of said receiving points by an amount equal to the interval between transmitted pulses, means for obtaining the difference between the delayed energy and the energy received at the other of said receiving points, and means for indicating said difference.

3. In an airborne radar moving target indicating system of the type in which returns from pairs of successively transmitted pulses of energy are subtracted in a cancellation circuit, means for feeding said cancellation circuit comprising a pair of receiving antennas located on the aircraft and spaced parallel to the ground track of the aircraft by a distance equal to twice the distance travelled by the aircraft during the interval between successive transmitted pulses.

4. An airborne radar moving target indicating system comprising first and second directional antennas located on the aircraft at points separated in a direction parallel to the ground track of the aircraft, means for applying periodic pulses of high frequency energy to said first antenna, means for delaying the reflected energy received by said first antenna by an amount equal to the interval between said pulses, means for subtracting the reflected energy received by said second antenna from said delayed energy, and means for indicating any difference resulting from said subtraction, the separation between said two antennas being equal to the distance travelled by said aircraft during the interval between said pulses.

5. Apparatus as claimed in claim 4 in which the patterns of said antennas are parallel.

6. Apparatus as claimed in claim 4 in which there is a small lagging angle between the pattern of said second antenna and the pattern of said first antenna.

7. An airborne moving target indicating system comprising a comparatively narrow directional transmitting antenna, means for applying pulses of high frequency energy to said transmitting antenna, first and second comparatively broad directional receiving antennas spaced in a direction parallel to the ground track by a distance equal to twice the distance travelled by the aircraft during the interval between said pulses, the patterns of said antennas being in parallel relationship, means for delaying the reflected energy received by said first antenna by an amount equal to the interval between said pulses, means for obtaining the difference between said delayed energy and the reflected energy received by said second antenna, and means for indicating said difference.

8. Apparatus as claimed in claim 7 in which the patterns of said transmitting and first receiving antennas are in parallel relationship but in which there is a small lagging angle between the pattern of said second receiving antenna and said first receiving antenna.

References Cited in the file of this patent

UNITED STATES PATENTS

| | | |
|---|---|---|
| 1,854,122 | Eaton | Apr. 12, 1932 |
| 2,116,717 | Scharlau | May 10, 1938 |
| 2,422,064 | Anderson et al. | June 10, 1947 |
| 2,604,621 | Earp et al. | July 22, 1952 |